United States Patent [19]

Eckersley

[11] Patent Number: 4,650,043

[45] Date of Patent: Mar. 17, 1987

[54] TELESCOPIC HYDRAULIC SHOCK ABSORBERS

[75] Inventor: John S. Eckersley, Pudsey, England

[73] Assignee: Jonas Woodhead Limited, Yorkshire, England

[21] Appl. No.: 745,659

[22] Filed: Jun. 17, 1985

Related U.S. Application Data

[63] Continuation of Ser. No. 647,028, Sep. 4, 1984, abandoned, which is a continuation of Ser. No. 336,715, Jan. 4, 1982, abandoned.

[30] Foreign Application Priority Data

Jan. 5, 1981 [GB] United Kingdom ............... 8100114

[51] Int. Cl.⁴ .............................................. F16F 9/34
[52] U.S. Cl. ........................... 188/322.14; 137/493.9; 137/512
[58] Field of Search ............... 188/281, 315, 318, 320, 188/322.14; 267/64.15; 137/493.8, 493.9, 512

[56] References Cited

U.S. PATENT DOCUMENTS

| | | | |
|---|---|---|---|
| 2,685,888 | 8/1954 | Strauss | 137/493.8 X |
| 3,519,109 | 7/1970 | Whisler, Jr. | 188/315 X |
| 3,584,712 | 6/1971 | Dickinson | 188/318 X |
| 3,706,362 | 12/1972 | Faure | 188/320 X |
| 4,054,277 | 10/1977 | Sirven | 188/318 X |
| 4,240,531 | 12/1980 | Postema | 188/315 |

FOREIGN PATENT DOCUMENTS

| | | | |
|---|---|---|---|
| 682978 | 11/1952 | United Kingdom | 188/315 |
| 1202225 | 8/1970 | United Kingdom | 188/322.14 |
| 2090644 | 7/1982 | United Kingdom | 188/322.14 |
| 2090943 | 7/1982 | United Kingdom | 188/322.14 |

*Primary Examiner*—Douglas C. Butler
*Assistant Examiner*—Richard R. Diefendorf
*Attorney, Agent, or Firm*—Price, Heneveld, Cooper, DeWitt & Litton

[57] ABSTRACT

A telescopic hydraulic shock absorber including a base valve assembly having a valve body with three arcuate slots which lie between two concentric valve seats which are overlain by a flat annulus constituting a recuperation valve. This valve is normally held in contact with the valve seats by a recuperation valve spring. A passage of complex shape extends through the center of the valve body and the mouth of the passage at the lower end is surrounded by an annular valve seat. A compression valve pin with a shank cooperates with the valve seat to form a compression valve and the shank is guided in a valve guide located in a counterbore in the aperture. The valve guide comprises a solid ring portion having six integral projections. There is an annular clearance between the valve pin and the part of the passage which is in communication with an annular space between the ring portion and the part of the passage through the passageways between the projections of the valve guide. Thus there is communciation from one side to the other of the valve body through the compression valve. Such an arrangement can be used to produce a range of base valve assemblies by providing different valve guides with passages of different cross-sections.

10 Claims, 7 Drawing Figures

TELESCOPIC HYDRAULIC SHOCK ABSORBERS

This is a continuation of application Ser. No. 647,028, filed Sept. 4, 1984 which application is a continuation of application Ser. No. 336,715, filed Jan. 4, 1982 both of which applications are now abandoned.

BACKGROUND OF THE INVENTION

This invention relates to telescopic hydraulic shock absorbers and is concerned with the base valve assemblies thereof.

It is known from GB No. 1202225 to provide a telescopic hydraulic shock absorber including a base valve assembly comprising a valve body, a compression valve pin having a shank extending through an aperture in the valve body and a head cooperating with a seat on the valve body to form the compression valve. In such a shock absorber the valve pin and aperture through the valve body are matched to one another and can therefore be used for only one shock absorber having defined characteristics.

SUMMARY OF THE INVENTION

According to the present invention, a telescopic hydraulic shock absorber includes a base valve assembly comprising: a compression valve pin having a shank and a head; a valve body with an aperture therethrough, said aperture including a counterbore; said valve body having a valve seat and said head of said valve pin cooperating with said valve seat to form the compression valve; and a valve guide which is located in the counterbore, has a bore in which said shank is guided, and is formed with a passage affording communication from one side to the other of said valve guide and hence from one side to the other of said valve body through said compression valve.

The shank of the valve pin is thus guided in a component which is separate from the valve body and is formed with a passage (or, or course, passages) leading to the compression valve. By providing different valve guides with passages of different cross-sections, it is possible to produce a range of base valve assemblies having all parts in common except the valve guides. The valve guides can easily be manufactured with passages which are accurately dimensioned.

Although the passage may be in the form of grooves in the surface of the bore in which the valve pin is guided in the valve guide, in the preferred construction the aperture includes a clearance between the valve body and the shank, the passage formed in the valve guide communicates with the clearance, the passage is bounded by the surface of the counterbore and the surface of a groove in the outer circumferential surface and one end surface of the valve guide.

In a preferred embodiment a telescopic shock absorber according to the present invention comprising a recuperation passageway extending through the valve body to valve seat means on the side of the valve body opposite to that of the compression valve seat, a recuperation valve cooperating with the valve seat means, a common spring seat member carried by the shank of the valve pin, a compression valve spring between the valve body and the seat member, and a recuperation valve spring extending between the recuperation valve and the seat member.

This preferred embodiment provides a base valve assembly in which the compression valve spring and the recuperation valve seat are retained by a common spring seat member, leading to ease of assembly, low weight and economy.

The spring seat member is preferably generally hat-shaped, the shank of the valve pin being secured to the base of the hat, the compression valve spring engaging the inner surface of the base of the hat, and the recuperation valve spring engaging an abutment carried by the side wall of the hat.

The invention may be carried into practice in various ways but one shock absorber or damper embodying the invention and a MacPherson strut representing a modification of the shock absorber will now be described by way of example with reference to the accompanying drawings, in which:

DESCRIPTION OF PREFERRED EMBODIMENTS

Figure 1:
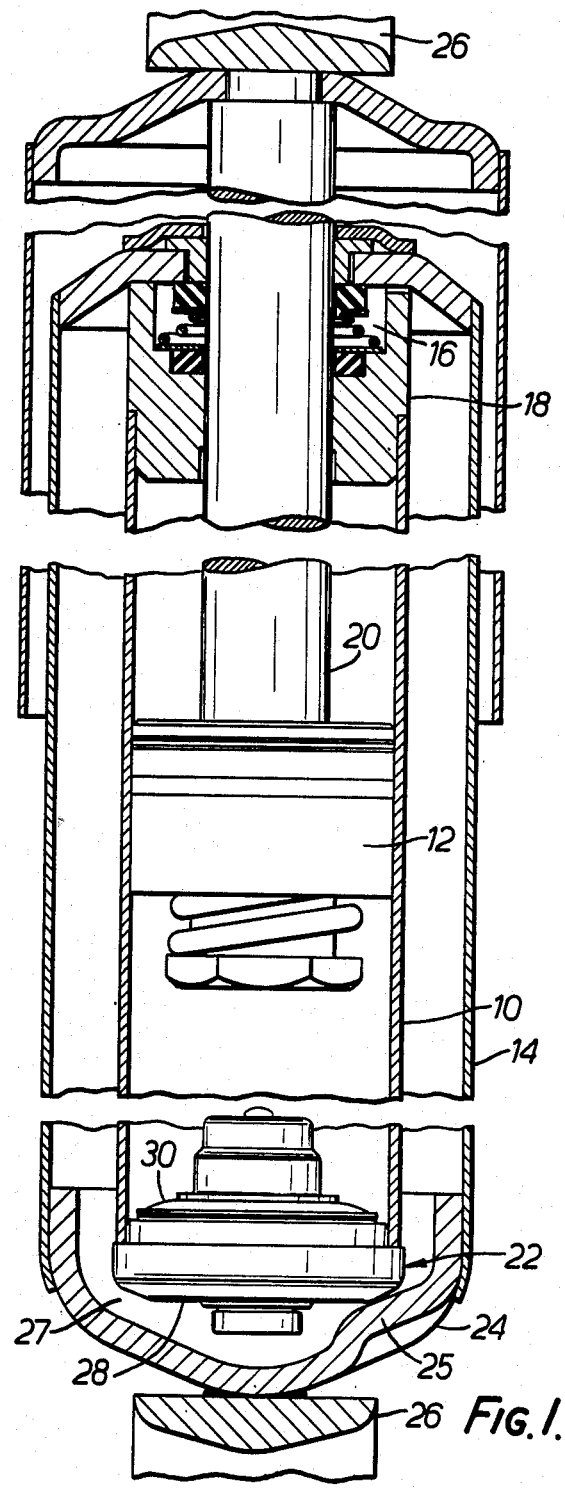
FIG. 1 is a longitudinal section through the shock absorber.

The shock absorber shown in FIG. 1 is of the two-tube type having an inner working cylinder 10 in which a working piston 12 is slidable and an outer cylinder 14 which is co-axial with the inner cylinder 10 and forms with the inner cylinder an annular reservoir. The top ends of the cylinders 10 and 14 are closed and maintained in co-axial relationship by a seal assembly 16 and a piston rod guide 18 through which extends the piston rod 20 carrying the working piston 12 at its lower end. The bottom end of the inner cylinder 10 is fitted with a base valve assembly 22 which is shown in greater detail in FIGS. 2A and 3A. The bottom end of the outer cylinder 14 is closed by a base cap 24 having circumferentially spaced portions 25 deformed inwards, the base valve assembly 22 abutting the inside of the inwardly deformed portions to maintain the inner cylinder co-axial with the outer cylinder.

The base cap 24 and the top end of the piston rod 20 are provided with eyes 26 by which the shock absorber is connected to the parts between which vibration is to be damped such as the body and road wheel respectively of a motor vehicle. The working piston 12 is provided with passages (not shown) which extend from one side of the piston to the other and are normally closed by two spring loaded valves (not shown). The inner working cylinder 10 and part of the annular reservoir are filled with oil; the remainder of the annular reservoir contains air at about atmospheric pressure. In an alternative construction the inner working cylinder and the annular reservoir are filled with oil and gas under pressure and in contact with one another.

In operation downward movement of the working piston 12 in the cylinder 10 results in a flow of oil from the space below the piston to the space above the piston through one of the spring loaded valves in the piston and there is also a flow of oil from the working cylinder 10 to the annular reservoir corresponding to the displacement of the piston rod 20 through the compression valve in the base valve assembly. When the piston 12 moves upwards in the cylinder 10 oil flows from the space above the piston through the other spring loaded valve in the piston to the space below the piston and there is also a flow of oil from the annular reservoir to the space below the piston through the recuperation valve in the base valve assembly 22.

The construction of the base valve assembly 22 will now be described in greater detail with reference to FIGS. 2A and 3A. The assembly includes a disc-like valve body 32 which is manufactured from sintered metal. Its outer surface includes a rebate 33 which receives the bottom end of the inner working cylinder 10. Extending through the valve body 32 are three arcuate slots 34 (see FIGS. 2B and 3B) which lie between two concentric valve seats 35, 36 which are overlain by a flat annulus 37 constituting the recuperation valve. This valve is normally held in contact with the valve seats by a recuperation valve spring 38 which comprises a flat annular portion or hub 39 having five fingers 41 which extend radially outwardly and are normally inclined slightly downwardly into contact with the recuperation valve.

Extending through the centre of the disc forming the valve body 32 is a passage 42 of complex shape. Its mouth at its lower end is surrounded by a downwardly facing annular valve seat 43. Progressing upwardly from the mouth the bore includes a first circular cylindrical portion 45 followed by a second circular cylindrical portion 46 of somewhat greater diameter and forming a shoulder 47. Above the second cylindrical portion 46 is a flared mouth portion 48.

Seated on the shoulder 47 and in the larger cylindrical portion 46 of the passageway 42 through the valve body 32 is a sintered valve guide 51 which comprises a solid ring portion 52 having six integral projections 53 which extend downwardly from the underside and outwardly from the lower part of the outer circumferential surface of the ring portion. As can be seen from FIG. 3B, the projections are approximately sector-shaped in plan.

A valve pin 55 extends through the passageway 42 in the valve body and is guided by the bore in the valve guide 51. There is an annular clearance 56 between the valve pin 55 and the first cylindrical portion 45 of the passageway 42 which is in communication with the annular space 57 between the upper part of the outer circumferential surface of the ring portion 52 and the second cylindrical portion 46 of the passageway 42 through the passageways between the projections 53 of the valve guide 51.

At its lower end, the valve pin 55 is formed with a head 58 the upper surface of which engages the valve seat 43 on the lower side of the valve body to form a compression valve. The top end of the valve pin is formed with a spigot 59 which passes through an aperture in the base of an inverted hat-shaped pressed-metal spring seat 62, the spigot being peened or riveted over the base. The lower edge of the side wall of the spring seat 62 extends into the annular space 57 and has fingers 63 bent out of it to provide downwardly facing surfaces against which the hub portion 39 of the recuperation valve spring 38 abuts. This hub portion fits around the side wall of the spring seat to be radially located thereby while the recuperation valve 37 has inwardly directed fingers which engage the side wall of the spring seat so that the recuperation valve is also radially located. A compression valve spring 64 surrounds the valve pin and extends between the under surface of the base 61 of the spring seat 62 and the upper surface of the valve guide 52, thus biasing the spring seat 62 upwardly and hence biasing the head 58 of the compression valve against the valve seat 43 on the underside of the valve body. The side walls of the spring seat 62 include a plurality of windows 65 permitting communication between the lower portion of the working cylinder and the interior of the spring seat.

Operation of the base valve is as follows. On compression of the shock absorber, the pressure in the lower part of the working cylinder rises, and some flow occurs upwardly through the piston 12 against the resistance of the piston compression valve. When pressure reaches a sufficient level, the pin 55 constituting the compression valve of the base valve assembly is moved against the resistance of the compression valve spring 64 and the very much lower force provided by the recuperation valve spring 38 so that the head 58 of the compression valve moves away from the valve seat 43 on the underside of the valve body. Flow then occurs from the working cylinder into the reservoir through the windows 65 and between the fingers 41 of the recuperation valve spring and the notches left by the bent out fingers to the annular space 57 around the valve guide 51. From here flow is through the grooves formed in the valve guide into the annular clearance 56 between the first cylindrical portion 45 of the passageways 42 and the valve pin 55.

On rebound, the compression valve will be held closed by the spring 64 and the pressure difference and flow will occur through the arcuate slots 34 and past the recuperation valve 34 which will open by lifting against the resistance of the recuperation valve spring 38.

Figure 2A:
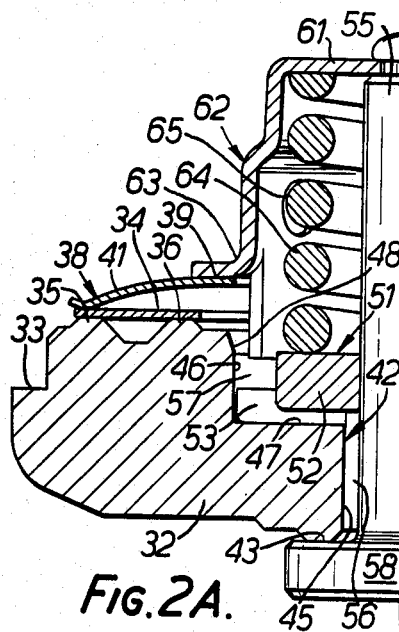
FIG. 2A is an axial half section of the base valve of the shock absorber shown in FIG. 1.
Figure 2B:
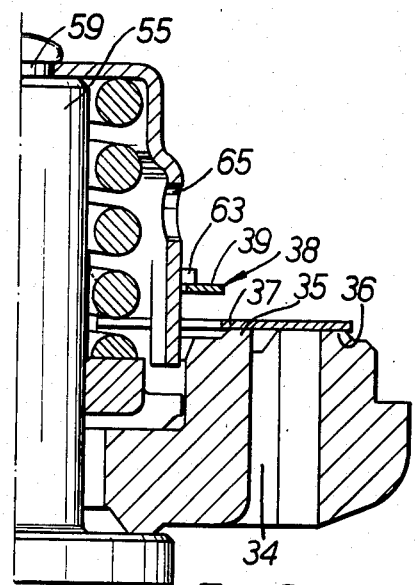
FIG. 2B is a half axial section of a base valve similar to that shown in FIG. 2A but modified so as to be of use in a MacPherson strut.
Figure 3A:
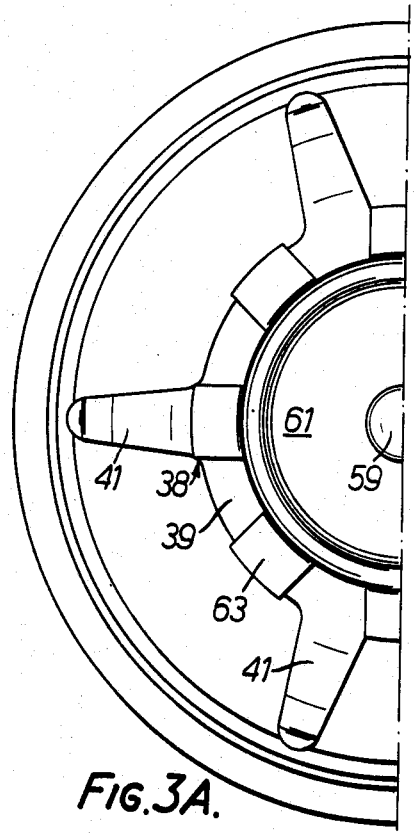
FIG. 3A is a half plan view of the base valve shown in FIG. 2A.
Figure 3B:
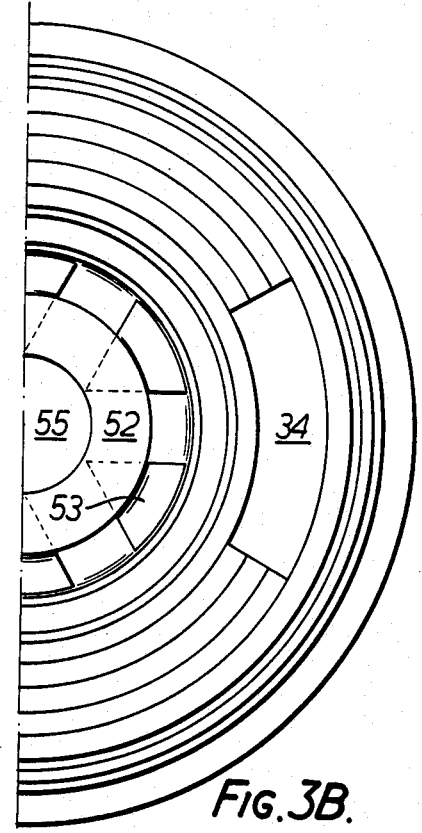
FIG. 3B is a half plan view of the base valve shown in FIG. 2A but with certain parts omitted.
Figure 4:
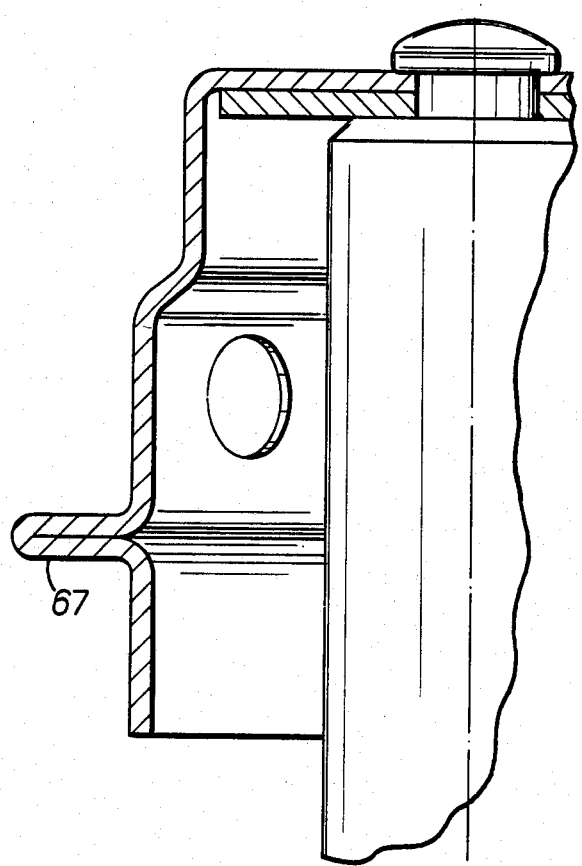
FIGS. 4 and 5 are fragmentary sections of modified components.
Figure 5:
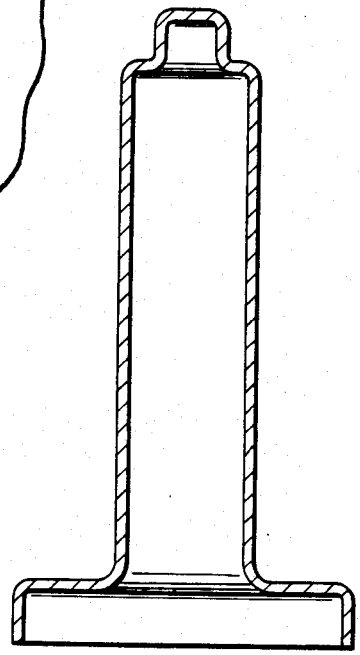

The base valve assembly shown in FIGS. 2B and 3B is very similar to that shown in FIGS. 2A and 3A and only the differences will be mentioned. Since a MacPherson strut provides wheel location and guidance and so has a larger diameter piston rod than a shock absorber which provides damping along and operates with greater flow through the base valve at lower pressures than is the case with such a shock absorber, many of the radial dimensions of the compression valve are increased. In another possible construction shown in FIG. 4, the fingers 63 of FIGS. 2A and 3A are replaced by a ring 67 which is formed by folding the side wall of the spring seat 62 in the course of manufacture of this component.

The base valve assembly can be assembled component by component from one end onto the valve pin 55, the final operation being the rivetting of the pin to the valve seat. This may be accomplished by simple automatic machinery or manually.

It is to be understood that the above is merely a description of the preferred embodiments of the invention and that various changes and alterations can be made without departing from the spirit and broader aspects of the invention as further defined in the appended claims.

I claim:

1. A telescopic hydraulic shock absorber including a base valve assembly comprising: a compression valve; a compression valve pin having a shank and a head; a valve body with an aperture therethrough, said aperture including a counterbore; said valve body having a valve seat and said head of said valve pin cooperating with said valve seat to form the compression valve; a valve guide located in the counterbore, said valve guide having a bore through which said shank extends and is guided, said valve guide being formed with a passage affording communication from one side to the other of said valve guide and hence from one side to the other of said valve body through said compression valve; a recuperation passageway extending through the valve body to valve seat means on the side of the valve body opposite to that of the compression valve seat, a recuperation valve cooperating with the valve seat means, a generally hat-shaped common spring seat member carried by the shank of the valve pin, said spring seat member having a base and the shank of said valve pin being secured to said base a compression valve spring, said compression valve spring being a coil spring and being between the valve body and the seat member and surrounding said valve pin and engaging the inner surface of said base, and a recuperation valve spring extending between the recuperation valve and the seat member, said recuperation valve spring being a spring washer engaging an abutment carried by the side wall of the spring seat member.

2. A shock absorber according to claim 1 in which the hat-shaped spring seat member is of pressed metal and the abutment is integral therewith.

3. A shock absorber according to claim 1 in which there is at least one window in the hat-shaped spring seat member.

4. A shock absorber according to claim 1 in which one end of the compression valve spring abuts the valve guide.

5. A telescopic hydraulic shock absorber including a base valve assembly including a valve pin having a shank and a head; a valve body having an aperture therethrough, said aperture including a counterbore having both radially and axially extending faces; said valve body having a valve seat and said head of said valve pin cooperating with said valve seat to form a compression valve; means provided a fluid flow restriction in said aperture, said means comprising: disk like annular valve guide seated in the counterbore having a central bore in which said shank is guided and having a passage affording fluid communication from one side to the other of said valve guide, said passage being recessed into one face of said valve guide and when said valve guide is seated in said counterbore the radially extending face of said counterbore forming one side of said passage, said passage forming the only opening for the movement of fluid through said aperture and having a throat therein of precise cross section for controlling the response characteristics of the shock absorber.

6. A telescopic shock absorber as described in claim 5 wherein a compression spring surrounds said valve pin and urges said compression valve into closed position, one end of said spring being seated against said valve guide and being the only means holding said valve guide within said counterbore.

7. A telescopic hydraulic shock absorber including inner and outer cylinders and a piston within the inner cylinder and a pressure relief valve at one end of the inner cylinder responsive to compressive forces generated by the piston for controlling the flow of fluid from the inner to the outer cylinder, the improvement in said valve comprising: a valve body closing the end of said inner cylinder and having a central aperture therethrough, said valve body having an outer face directed away from said inner cylinder; a valve pin extending through said aperture and forming an annular passage surrounding said valve pin; said valve pin having a head adapted to seat against said outer face of said valve body for closing said passage; said valve body having a counterbore facing away from said head communicating and concentric with said annular passage; a disk like valve guide seated in said counterbore closely engaging both the valve pin and the walls of said counterbore; a spring seat mounted on the end of the valve pin within said inner cylinder and a compression spring surrounding said valve pin and seated against both said spring seat and said valve guide for holding said head in normally closed position against said valve body; said valve guide having a fluid passage therethrough providing the only path by which fluid can flow out from said inner cylinder, said passage serving as a fluid flow restriction for controlling the shock absorbers' rate of response to shock loading when said valve pin head is unseated.

8. A telescopic hydraulic shock absorber including an inner cylinder having a piston therein and a pressure relief valve at one end of the inner cylinder responsive to compressive forces generated by the piston for controlling the flow of fluid out of the inner cylinder, the improvement in said valve comprising: a valve body closing the end of said cylinder and having a central aperture therethrough; a valve having a pin extending through said aperture and forming an annular passage concentric therewith and having a valve head adapted to seat against a face of said valve body directed away from said inner cylinder for closing said passage; said valve body having a counterbore facing away from said head and concentric with said annular passage and communicating with the interior of said inner cylinder; a disk like valve guide seated in said counterbore, closely engaging both the valve pin and the walls of said counterbore; a compression spring urging said valve head into normally closed position against said valve body; said valve guide having a fluid passage therethrough providing the only path by which fluid can flow out from said inner cylinder, said passage having a throat therein of precise dimension and flow capacity, said passage serving as a fluid flow restriction for controlling the shock absorbers' response rate to shock loading whereby the response characteristics of the shock absorber can be changed by replacing the valve guide with another one having a throat of a different dimension.

9. A telescopic hydraulic shock absorber including an inner cylinder having a piston therein and a pressure relief valve at one end of the inner cylinder responsive to compressive forces generated by the piston for controlling the flow of fluid out of the inner cylinder, the improvement in said valve comprising: a valve body closing the end of said inner cylinder and having a central aperture therethrough; a valve having a pin extending through said aperture and forming an annular passage concentric therewith and having a valve head adapted to seat against a face of said valve body directed away from said inner cylinder for closing said passage; said valve body having a counterbore facing away from said head and concentric with said annular passage and communicating with the interior of said inner cylinder; a disk like valve guide seated in said counterbore, closely engaging both the valve pin and the walls of said counterbore; said valve guide having a first portion of a diameter to seat closely within and against a base of said counterbore and a second portion concentric with said first portion of lesser diameter; at least one radially extending fluid passage in said first portion opening through a face of said first portion seated against the base of said counterbore, said second portion overlying a portion of said passage and in cooperation with the base of said counterbore forming a precisely dimensioned flow control throat therein, said throat providing the only path by which fluid can flow out of said inner cylinder whereby said throat controls the shock absorbers' response rate to shock loading.

10. A telescopic shock absorber as described in claim 9 wherein said valve guide has a plurality of passages each having a throat therein.

* * * * *